United States Patent [19]
Juntti

[11] Patent Number: 5,420,889
[45] Date of Patent: May 30, 1995

[54] DECODING USING A LINEAR METRIC AND INTERFERENCE ESTIMATION

[75] Inventor: Juhani Juntti, Puuppola, Finland

[73] Assignee: Nokia Mobile Phones Ltd., Salo, Finland

[21] Appl. No.: 109,324

[22] Filed: Aug. 19, 1993

[30] Foreign Application Priority Data

Aug. 20, 1992 [FI] Finland ................................ 923739

[51] Int. Cl.⁶ .................... H03D 1/04; H03D 1/06; H03K 5/01; H04B 1/10
[52] U.S. Cl. .................... 375/346; 375/343; 375/345; 455/245.1; 455/296
[58] Field of Search ............ 375/26, 27, 94, 98, 375/99, 101, 96; 455/234.1, 245.1, 250.1, 307, 296, 63, 232.1

[56] References Cited

U.S. PATENT DOCUMENTS

| | | | |
|---|---|---|---|
| 4,625,240 | 11/1986 | Yablonski et al. | 375/98 |
| 4,682,230 | 7/1987 | Perlman et al. | 358/167 |
| 4,843,615 | 6/1989 | Davis | 375/98 |
| 4,882,737 | 11/1989 | Dzung | 375/15 |
| 4,906,928 | 3/1990 | Gard | 324/240 |
| 4,910,467 | 3/1990 | Leitch | 329/306 |
| 4,928,258 | 5/1990 | May | 364/724.17 |
| 5,142,551 | 8/1992 | Borth et al. | 375/7 |
| 5,235,424 | 8/1993 | Wagner et al. | 358/174 |
| 5,271,042 | 12/1993 | Borth et al. | 375/101 |
| 5,285,480 | 2/1994 | Chennakeshu et al. | 375/101 |

FOREIGN PATENT DOCUMENTS

0386985A2 12/1990 European Pat. Off. .
2243733 6/1991 United Kingdom .

OTHER PUBLICATIONS

Patent Abstracts of Japan, vol. 11, No. 245 (E-531) 11 Aug. 1987 & JP-A-62 059 420 (Toshiba Corp) 16 Mar. 1987.

"A Theoretical Analysis of the Properties of Median Filters" N. C. Gallagher et al., IEEE Trans. on Acoustics, Speech, and Signal Processing, vol. ASSP-29, No. 6, Dec. 1981.

"FIR-Median Hybrid Filters", P. Heinonen et al., IEEE Trans. on Acoustics, Speech and Signal Processing, vol. ASSP-35, No. 6, Jun. 1987.

"Performance of Digital Matched Filter Correlator with Unknown Interference", C. R. Cahn, IEEE Trans. on Communication Technology, vol. COM-10, No. 6, Dec. 1971.

Primary Examiner—Stephen Chin
Assistant Examiner—Don N. Vo
Attorney, Agent, or Firm—Perman & Green

[57] ABSTRACT

In a decoding system according to the invention, a digital signal received from an AWGN channel interfered by pulse interferences is so decoded (8) that the AGC control signal (10) of the RF/IF circuits of the reception is produced by median filtering (21) for the essential removal of the effect of pulse interferences, and that the interference is measured using a linear metric, whereby an external interference estimation circuit (30) is preferred.

19 Claims, 4 Drawing Sheets

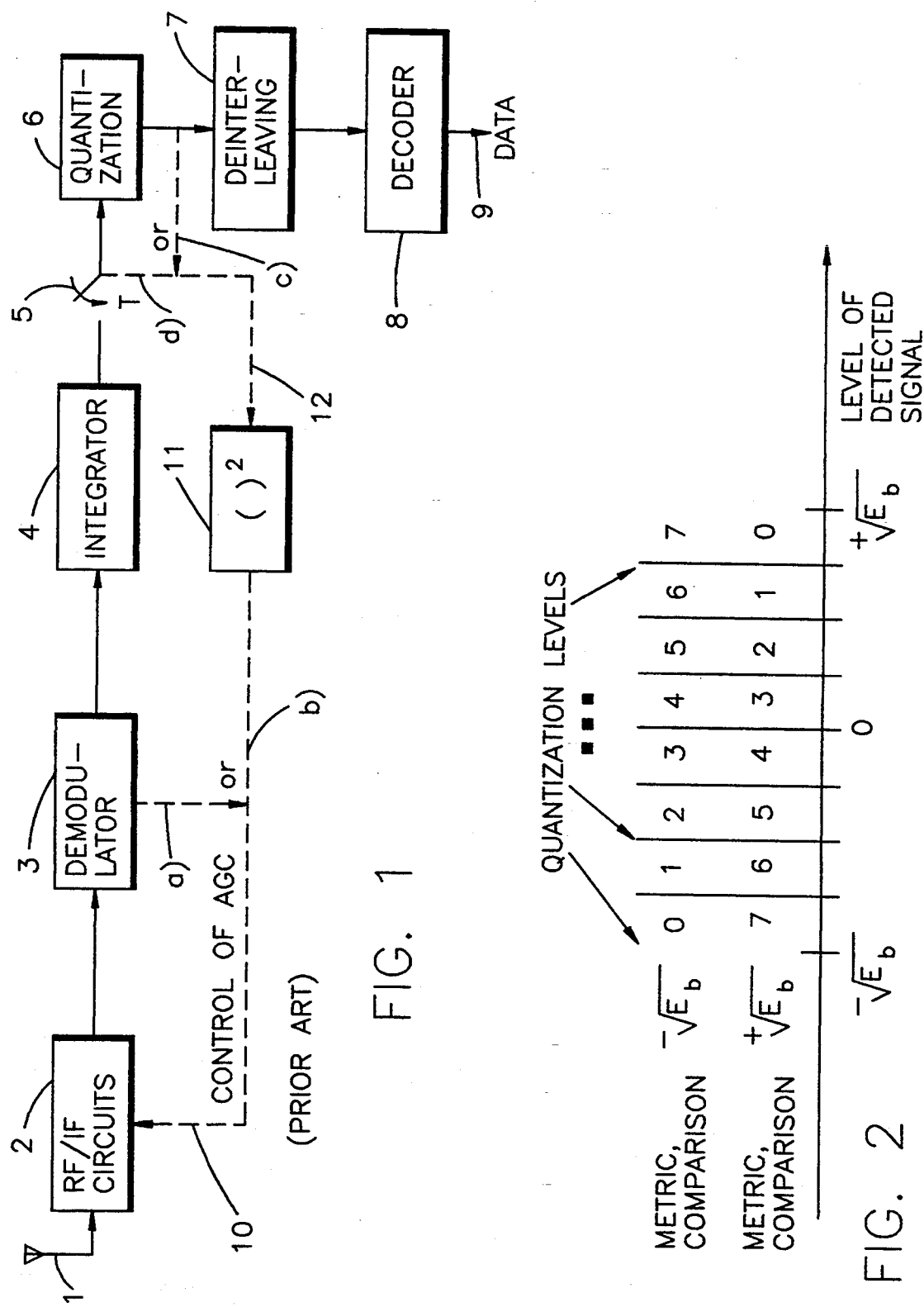

DECODING USING A LINEAR METRIC AND INTERFERENCE ESTIMATION

FIELD OF THE INVENTION

The present invention relates to a decoding method and apparatus for decoding a digital signal received from an AWGN channel interfered by pulse interferences.

BACKGROUND OF THE INVENTION

In radio apparatus, e.g. digital cellular mobile phones, the encoding and decoding methods employed have been widely studied. In reception pulsed signal interferences create problems which makes a received signal difficult to process by methods known in the art. The problems related to pulsed interferences has in the past been studied e.g. in an article by K. R. Matis, J. W. Modestino: Performance of Selected Coded Direct-Sequence Receiver Structures in Pulsed Interference, Milcom 1985, vol. 3, Boston, Mass. In said article the principle of interference measurement is described, but there is no mention of how to implement said measurement. In the reference it is also not mentioned how an AGC signal can be made to comply with the level of a utility information signal included in a received signal.

Decoding methods have also been studied by means of simulation, and the main results thereof are published in the following references: (1) J. Juntti: Performance Simulations of a Convolutionally Coded DS Systems in Pulsed Noise Interference, Licenclate's Dissertation, University of Oulu, Department of Electricity, May 1990; and (2) K. Jyrkkä: Performance Simulations of a Convolutionally Coded DS System in Pulsed CW Interference, Diploma study, University of Oulu, Department of Electricity, November 1990. Said references give no suggestions for solution of how the AGC signal could in practice be made to conform ideally to the level of the information signal.

In conventional receivers the decoding operation can be carried out e.g. by means of a circuit arrangement like the one shown in FIG. 1. The radio frequency circuits 2 of a receiver process, i.e. amplify and convert, the signals received from an antenna 1 so that they can be processed in a demodulator circuit 3. The result of the demodulation is conducted to an integrator 4, from the output of which samples are taken at symbol time intervals T. The samples are conducted further to a quantization circuit 6. The processing of the frames of the received digital signal, i.e. deinterleaving, is carried out in circuit 7, and the output thereof is conducted to a decoder circuit 8, from the output of which the utility data 9 contained in the signal received with the antenna 1 is provided.

As mentioned above, after demodulation the received signal is conducted to a quantization circuit 6. In the quantization circuit 6 the received signal is quantized into three or more levels (soft decision quantization) instead of using two level quantization (hard decision quantization). In such soft decision quantization, reliability information is added to every symbol decision. The reliability information can be presented, for example, as shown in FIG. 2, where 8 quantization levels are used. There are two numbers showing the reliability information for each quantization interval. These numbers are called metrics and they are determined separately when the received signal is compared with both of the symbols. The metrics are used in decoding algorithms.

An optimal convolution decoder is used to minimize error probability in a long symbol sequence. The error probability of a sequence will be minimized when such a sequence is selected so that a so called Euclidjan distance is minimized compared to the received symbol sequence. The optimal decoder calculates the Euclidean distance for each received sequence of all possible transmitted sequences. The calculation of the Euclidean distances is done by adding, after every symbol decision (soft decision), a metric corresponding to the Euclidean distance of each sequence. Usually the distances are calculated using the Viterbi algorithm Optimum values for the metrics can be calculated, when the quantization levels are fixed and if the statistical properties of interfering signals are known. It is known in the art to optimize metrics in AWGN (Additive White Guassian Noise) channels. However, when pulse interference occurs in such a channel, the metrics calculated at above can no longer be optimal. Again, if the statistical properties of the pulse interference are known it is possible to calculate the optimal metric values, but usually in communication systems the properties of the interference signal are not known a priori. The optimal receiver should measure the interference and then analyse the statistical properties of the interference. To avoid these difficulties in receiver realisation, the metrics of the AWGN-channel are usually used. A drawback is that the performance is degraded considerably when pulse interferences occur in the channel, the metrics can no longer be optimal unless changed to conform with the noise strength.

In the Finnish patent application no. 923738 filed simultaneously with the corresponding Finnish patent application to this application, the formation of an AGC control signal is presented optimally using median filtering with which the AGC control signal ideally conforms with the level of the information signal.

SUMMARY OF THE INVENTION

According to a first aspect of the present invention there is provided a method for decoding a digital signal having at least one pulse interference superimposed thereon and detected at a receiver means comprising;
  i) estimating said at least one pulse interference using a linear metric,
  ii) median filtering said digital signal for producing an AGC control signal, and
  iii) coupling said AGC control signal to RF/IF circuits of said receiver for controlling said RF/IF circuits,
thereby inhibiting the effect of said at least one pulse interference.

According to a second aspect of the invention there is provided a circuit arrangement for decoding a digital signal having at least one pulse interference superimposed thereon, comprising a first quantization means (25) for quantizing the digital signal and having an output therefrom coupled to a squaring means (11) for squaring a quantized signal, and a median filter (21) having an input coupled to an output of said squaring means (11), wherein said median filter (21) is capable of outputting a signal (10) for controlling an AGC means and said at least one pulse interference is adapted by an interference estimation means (30) for use as measurement data in a second quantization means (6) prior to said digital signal being decoded in a decoder means (8).

This has the advantage that decoding can be carried out optimally even when pulse noise occurs in a channel and is simple to realise.

Preferably, bits exceeding a predetermined level (+A, −A) are rejected.

BRIEF DESCRIPTION OF THE DRAWINGS

FIG. 1 presents a method known in itself in the art for forming an AGC control signal, FIG. 2 presents the selection of a metric linearly using 8-level quantization.

DETAILED DESCRIPTION OF THE INVENTION

The invention is described in detail below, by way of example only and with reference to the drawings.

Figure 4:
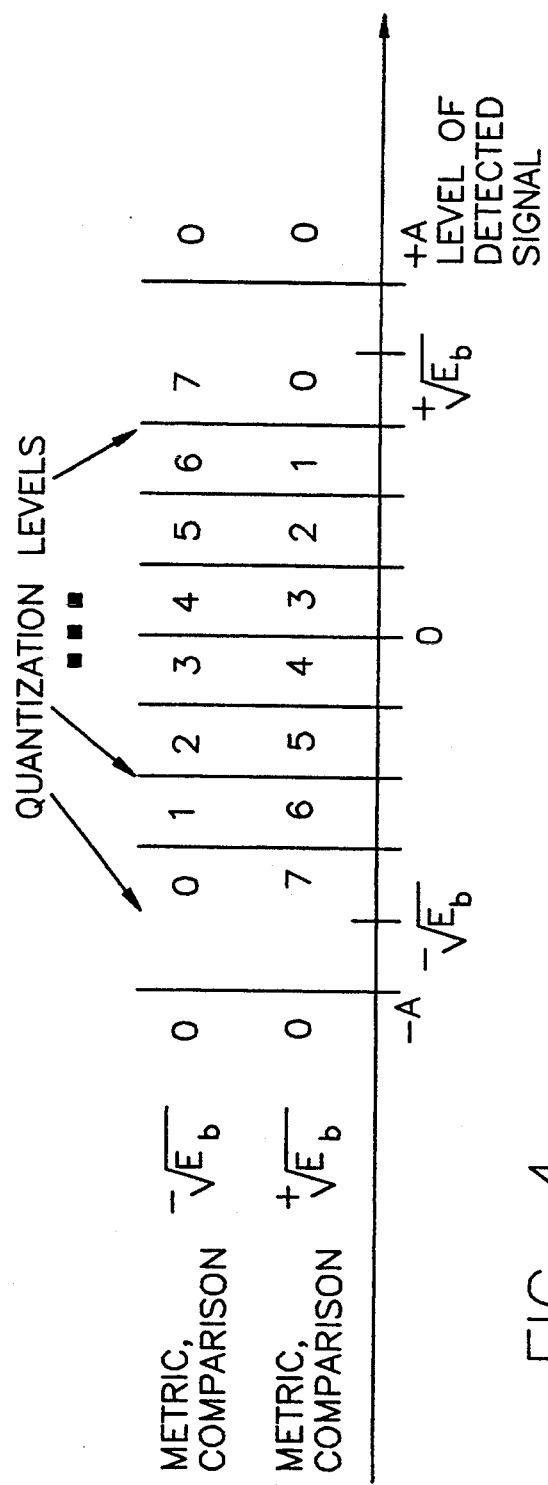
FIG. 4 presents the selection of a metric linearly by means of 8-level quantization when the bits exceeding a given level are rejected.

The optimal decision metrics in an AWGN channel change almost linearly when moving from one quantization region to another in the signal to noise region of practical interest. The metrics are quantized most often into integers, as shown in FIGS. 2 and 4, because the addition thereof is simple. This can be done because in a Viterbi algorithm only relative distances are calculated for different sequences. The linear decision rule is independent of the signal to noise ratio. The use of uniform quantization and linear metrics results in a simple receiver and nearly optimum performance can be achieved in AWGN channels having pulsed interference.

The method and apparatus can be used with an ideal AGC control which is insensitive to pulse interferences. This is implemented advantageously using median filtering of the AGC signal for producing a squaring circuit 11, shown in FIG. 1, and for producing an AGC control signal 10 between the RF/IF circuits. The application is presented also in FIG. 5, described below. The use of median filtering in a circuit arrangement according to FIG. 1 is described in detail in the parallel patent application of the present applicant, referred to in the foregoing, in which the AGC control signal is filtered with a median filter. In the present context the median filtering also refers to a kind of modified median filtering with which the pulse-like interferences of a received signals are eliminated. With the aid of median filtering an AGC control complying with the level of the information signal is obtained almost ideally. It is not sensitive to rapid changes of the level, unlike e.g. in averaging. Thus, median filtering efficiently removes the effect of pulse interferences on the AGC in the RF receiver.

In the present decoding the method and decoder, a linear metric is advantageously used in conjunction with a Viterbi algorithm, being limited to the range $-\sqrt{E_b} \ldots +\sqrt{E_b}$, as shown in FIG. 2, where $E_b$ in the figure refers to the bit energy proportional to the amplitude. The level of the detected signal is represented by the horizontal axis in FIG. 2. In association with the control principle of AGC disclosed in said copending patent application it is preferred that a decoder of soft decision, or at least three-level quantization, is used. Hereby, a convolution code is used in general. In principle, the median filtering may also be implemented analogically in a manner known to a person skilled in the art.

The values of the metric are arbitrary; only the relative values thereof have any significance. The signal range $-\sqrt{E_b} \ldots +\sqrt{E_b}$ contains preferably e.g. three, more preferably however eight, or most preferably, 16 levels. The numerical values of the quantization levels, as in the example of FIG. 2 are in the range 0 to 7, and increase in magnitude from either left to right, as on the upper line (comparison $-\sqrt{E_b}$), or from right to left, as on the lower line (comparison $+\sqrt{E_b}$). Multilevel quantization requires precise follow-up (AGC) of the signal level in the receiver so that the quantization levels can be fixed although the signal attenuation changes.

Figure 3A:
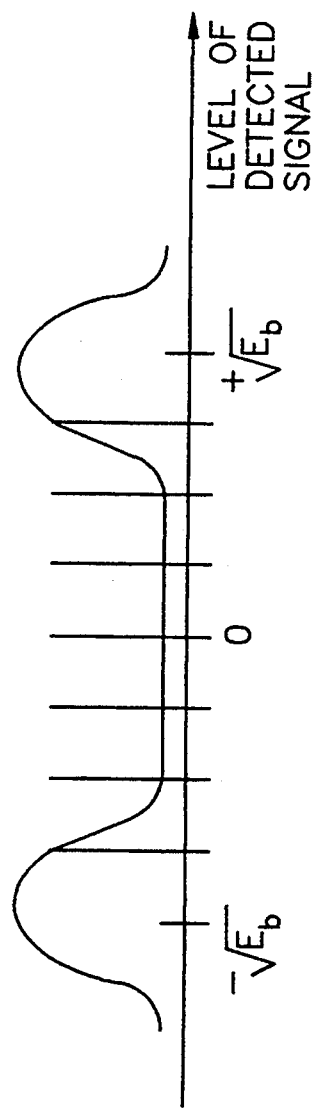
FIGS. 3a and 3b present the probability density distributions are presented as functions of the level of the detected signal without any interferences in the channel (3a), and with an interference pulse (3b) in the channel.
Figure 3B:
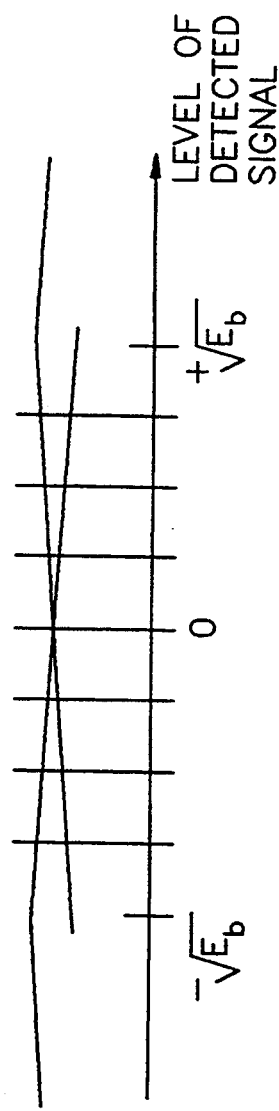

FIGS. 3a and 3b show a probability density distribution as a function of the detected signal level. When an interference pulse occurs, as in FIG. 3b, the bit error probability is great, but with the aid of the decoder most of the bit errors to be produced can be corrected. After eliminating the interference, reliable symbols can immediately be provided from the receiver, and no resettling of AGC onto the right level needs to be expected. Let it be mentioned that an interference pulse here refers also to noise and Pseudo-Noise.

Quantization presented above in FIG. 2 can be developed further to conform to FIG. 4, according to which the bits exceeding a predetermined level A (−A or +A) are rejected. In other words, an extra quantization level is set. When an interference pulse occurs, a probability density distribution as shown in FIG. 3b is produced. In that case it is high probability, that the level of the detected signal is less than −A or larger than +A. When no interference exists, it is very unlikely that the level of the detected signal lies above +A or below −A. When a strong interference pulse occurs any useful information cannot get to the receiver. Usually special precautions are not used in these kind of situations. Instead, the resultant errors are only tried to be corrected by the decoder. By setting the above mentioned extra quantization levels and by selecting the same values for metrics compared to every symbol when the level of the detected signal is less than −A or larger than +A, the higher performance of the decoder results. So the Euclidean distances of all of the sequences are changed by an equal amount and order of the sequences will stay unchanged. This means, that the symbol is erased, because it has no affect in decoding. For the value to be added zero is preferred because now the distance of the path will not grow unnecessarily. The signals exceeding the value ± A may have any metric number, but the main thing is that the numbers are equal in either case.

It is well known in the art that if unreliable symbols are identified and erased before decoding, a decoder can correct almost twice as many errors than if the unreliable symbols had not been identified and erased. This is one of the facts which results in a better performance of a receiver utilising the present invention over known receivers.

The receiver may also be a DS spread spectrum receiver, whereby composing a signal is carried out prior to the demodulator according to the correlation principle (e.g. 9 correlator, matched filter). In a DS spread spectrum system like this, metrics presented in association with the above-presented FIGS. 2 and 4 can be used.

Figure 5:
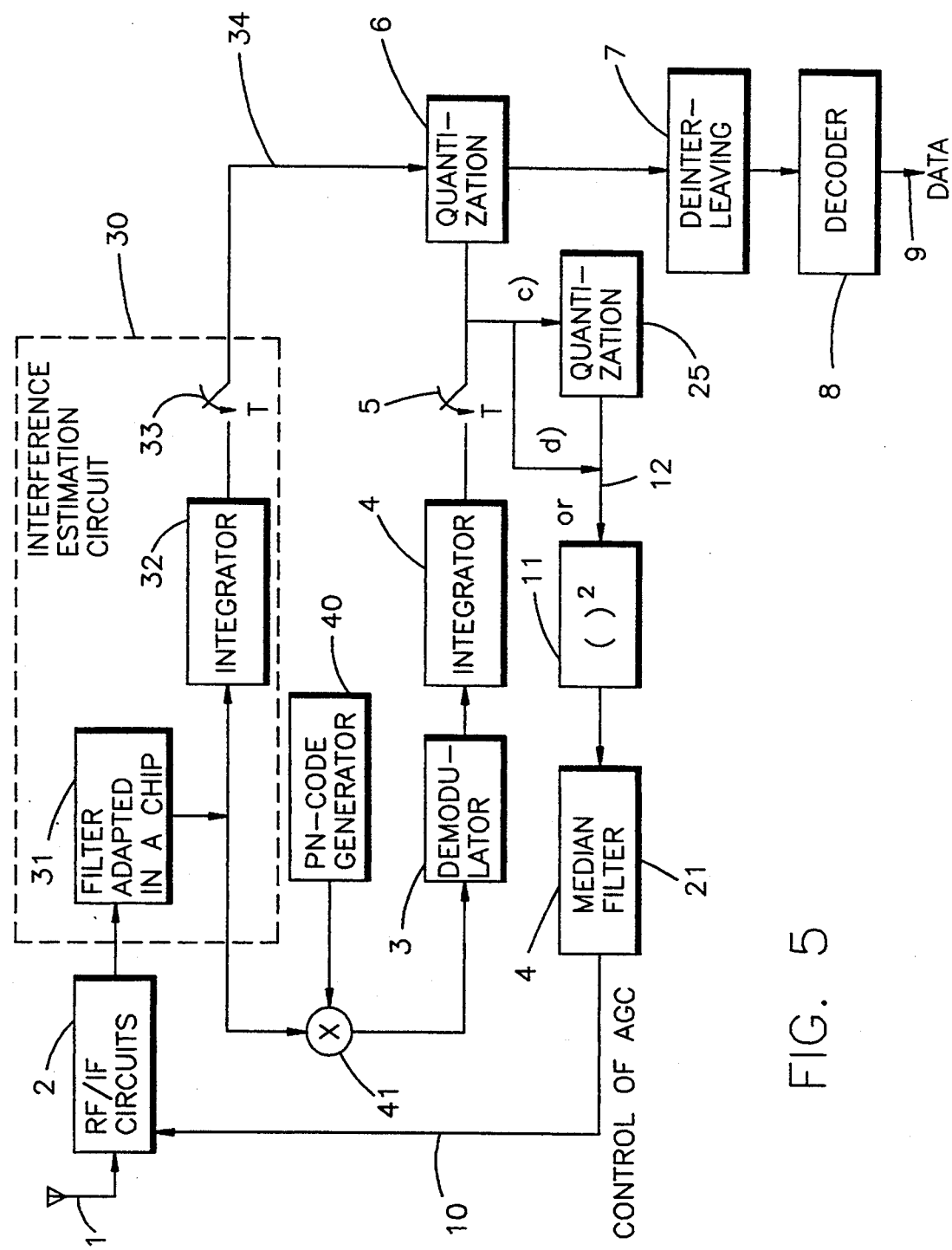
FIG. 5 shows a block diagram of a receiver provided with a circuit of interference estimation and a median filter for producing an AGC control signal.

Alternatively, quantization of FIG. 4 is used in a circuit arrangement utilizing external measurement information, e.g. with an integrate-dump detection measuring the external interference, according to the principle block diagram presented in FIG. 5. The estimation of interference is now carried out from a spread spectrum signal. The bits exceeding a given level A are rejected in the same way as in using the metric shown in FIG. 4, and the rejection information is provided from a wideband signal prior to despreading the spectrum. Hereby, the information about the level of interference is made more reliable than by measuring it after despreading the spectrum.

In the block diagram shown in FIG. 5 the same reference numerals are used for the same circuits as in FIG. 1. The AGC control signal is filtered with a median filter 21 with which the pulse-like interferences of a signal received with antenna 1 are removed. The signal is conducted into median filtering from the output of the switch 5. FIG. 5 presents two alternative ways, in which the signal 12 is conducted along a route (c) through the quantization circuit 25, and along an alternative route (d) directly to the squaring circuit 11. The output signal 10 of the median filter is equivalent to the AGC control signal of FIG. 1.

The state of the channel is now measured with a circuit 30 estimating the external interference by which the measurement information 34 is produced for the quantization circuit 6. The measurement information is utilized in determining the values of the metric. The estimation circuit is provided with a matched filter 31 implementable e.g. with one chip, and with an integrator 32. From the output of the integrator measurement information 34 is provided through switch 33.

The circuit arrangement moreover includes a PN code generator 40, the output signal thereof being carried to a multiplier means 41. The other input of the multiplier 41 is the reception signal filtered with circuit 31 from circuit 2. The output of the multiplier is then conducted to a demodulator, With the aid of the PN code generator 40 the spectrum is despread (PN = Pseudo-Noise). The interference is thus estimated in circuit 30 prior to despreading the signal.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention, The applicant hereby gives notice that new claims may be formulated to such features during prosecution of this application or of any such further application derived therefrom.

What we claim is:

1. A method for decoding a digital signal having a pulse interference superimposed thereon, comprising the steps of:

operating a receiver to receive the digital signal from a communications channel;

estimating the pulse interference that is superimposed on the received digital signal;

decoding the received digital signal, the step of decoding including a step of quantizing the received digital signal with n-level quantization, where n is an integer greater than two, to generate a plurality of metrics, the step of decoding employing the estimate of the pulse interference so as to substantially remove an effect of the pulse interference;

median filtering the received digital signal to generate an automatic gain control (AGC) signal that is substantially free of an effect of the pulse interference; and controlling a gain of the receiver with the AGC signal.

2. A method as set forth in claim 1 wherein the step of median filtering includes initial steps of:

demodulating and integrating the received digital signal; and squaring the demodulated and integrated received digital signal.

3. A method as set forth in claim 1 wherein the step of median filtering includes initial steps of:

demodulating and integrating the received digital signal;

quantizing the demodulated and integrated received digital signal with multi-level quantization; and squaring the quantized, demodulated and integrated received digital signal.

4. A method as set forth in claim 1 wherein the step of median filtering includes an initial step of filtering the received digital signal with a matched filter.

5. A method as set forth in claim 1 wherein the step of estimating includes the initial steps of:

filtering the received digital signal with a matched filter to generate a filtered digital signal; and integrating the filtered digital signal.

6. A method as set forth in claim 1 wherein the step of quantizing generates quantization levels in response to an occurrence of pulse interference; and wherein the step of decoding includes a step of rejecting those quantization levels having values corresponding to the occurrence of pulse interference.

7. A method as set forth in claim 1 wherein the step of quantizing and the step of median filtering each include the initial steps of:

filtering the received signal;

multiplying the filtered received signal by a pseudo-noise code; and demodulating and integrating the multiplied and filtered received digital signal.

8. Apparatus for decoding a digital signal having a pulse interference superimposed thereon, comprising:

a receiver for receiving the digital signal from a communications channel;

means, coupled to an output of said receiver, for estimating the pulse interference that is superimposed on the received digital signal;

means, coupled to an output of said receiver, for decoding the received digital signal, said decoding means including means for quantizing the received digital signal with n-level quantization, where n is an integer greater than two, to generate a plurality of metrics, said decoding means being coupled to said estimating means so as to substantially remove an effect of the pulse interference; and means, having an input coupled to an output of said receiver, for median filtering the received digital signal to generate at an output an automatic gain control (AGC) signal that is substantially free of an effect of the pulse interference, said output of said median filtering means being coupled to said receiver for controlling a gain of said receiver with said AGC signal.

9. Apparatus as set forth in claim 8 and further comprising:
means for demodulating and integrating the received digital signal; and
means for squaring the demodulated and integrated received digital signal, said squaring means having an output coupled to said input of said median filtering means.

10. Apparatus as set forth in claim 8 and further comprising:
means for demodulating and integrating the received digital signal;
means for quantizing the demodulated and integrated received digital signal with multi-level quantization; and
means for squaring the quantized, demodulated and integrated received digital signal, said squaring means having an output coupled to said input of said median filtering means.

11. Apparatus as set forth in claim 8 and further comprising a matched filter means interposed between said receiver and said input of said median filtering means.

12. Apparatus as set forth in claim 8 wherein said estimating means is comprised of:
matched filter means having an input coupled to said output of said receiver for generating a filtered digital signal; and
means for integrating the filtered digital signal.

13. Apparatus as set forth in claim 8 wherein said quantizing means includes means for generating quantization levels in response to an occurrence of pulse interference, and wherein said decoding means includes means for rejecting those quantization levels having values corresponding to the occurrence of pulse interference.

14. Apparatus as set forth in claim 8 and further comprising:
means, having an input coupled to said output of said receiver, for filtering the received signal;
means for generating a predetermined pseudo-noise (PN) code;
means for multiplying the filtered received signal by said pseudo-noise code; and
means for demodulating and integrating the multiplied and filtered received digital signal.

15. A communications receiver having a closed-loop Automatic Gain Control (AGC) system, comprising:
first means for receiving and amplifying a high-frequency signal;
second means, having an input coupled to an output of said first means, for demodulating said received and amplified signal;
third means, having an input coupled to an output of said second means, for generating samples of said demodulated signal at periodic intervals;
fourth means, having an input coupled to an output of said third means, for quantizing said sampled, demodulated signal with a multi-level quantization and for outputting, for each of said samples, a quantized output signal;
fifth means, having an input coupled to an output of said fourth means, for decoding said quantized output signals;
sixth means, having an input coupled to said output of said third means, for median filtering of said samples to generate an AGC signal that is substantially free of an effect of pulse interference that is received with said received high-frequency signal, said generated AGC signal being coupled to said first means for controlling the amplification of said high-frequency signal; and
seventh means, having an input coupled said output of said first means, for estimating the pulse interference that is received with said received high-frequency signal, said seventh means having an output coupled to said fourth means whereby an effect of the pulse interference is substantially eliminated.

16. A communications system as set forth in claim 15, wherein the sampled, demodulated signal is quantized with at least three-level quantization.

17. A communications system as set forth in claim 15, wherein the sampled, demodulated signal is quantized with eight-level quantization.

18. A communications system as set forth in claim 15 wherein said high frequency signal is a spread spectrum signal, and further comprising means, interposed between said first means and said second means, for despreading the spread spectrum signal.

19. A communications system as set forth in claim 15 wherein said fifth means includes means for Viterbi decoding said quantized output signals.

* * * * *